Oct. 11, 1955 A. C. DAUDET 2,720,052

COMBINED TELEPHONE TRAY AND MEMO PAD SUPPORT

Filed July 26, 1954

Andre C. Daudet
INVENTOR

BY C.A. Snow & Co.
ATTORNEYS.

United States Patent Office 2,720,052

Patented Oct. 11, 1955

2,720,052

COMBINED TELEPHONE TRAY AND MEMO PAD SUPPORT

André C. Daudet, Yonkers, N. Y.

Application July 26, 1954, Serial No. 445,609

1 Claim. (Cl. 45—.5)

This invention relates to a combined telephone tray and memo pad support, the memo pad support being so arranged with respect to the telephone tray that ready access may be had to the pad for making notes during a telephone conversation.

An important object of the invention is to provide a device of this character wherein the memo pad support is formed as an integral part with the telephone tray and rests on a supporting surface with the telephone tray, to the end that the telephone tray, together with the telephone supported therein, acts as an anchor for holding the memo pad and its support against movement while the pad is being used in making notes.

A further object of the invention is to provide a combined telephone tray or holder and memo pad which may be economically manufactured of plastic material, and one which will lend itself favorably for decoration and the carrying out of color schemes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figures 1, 2, 3:
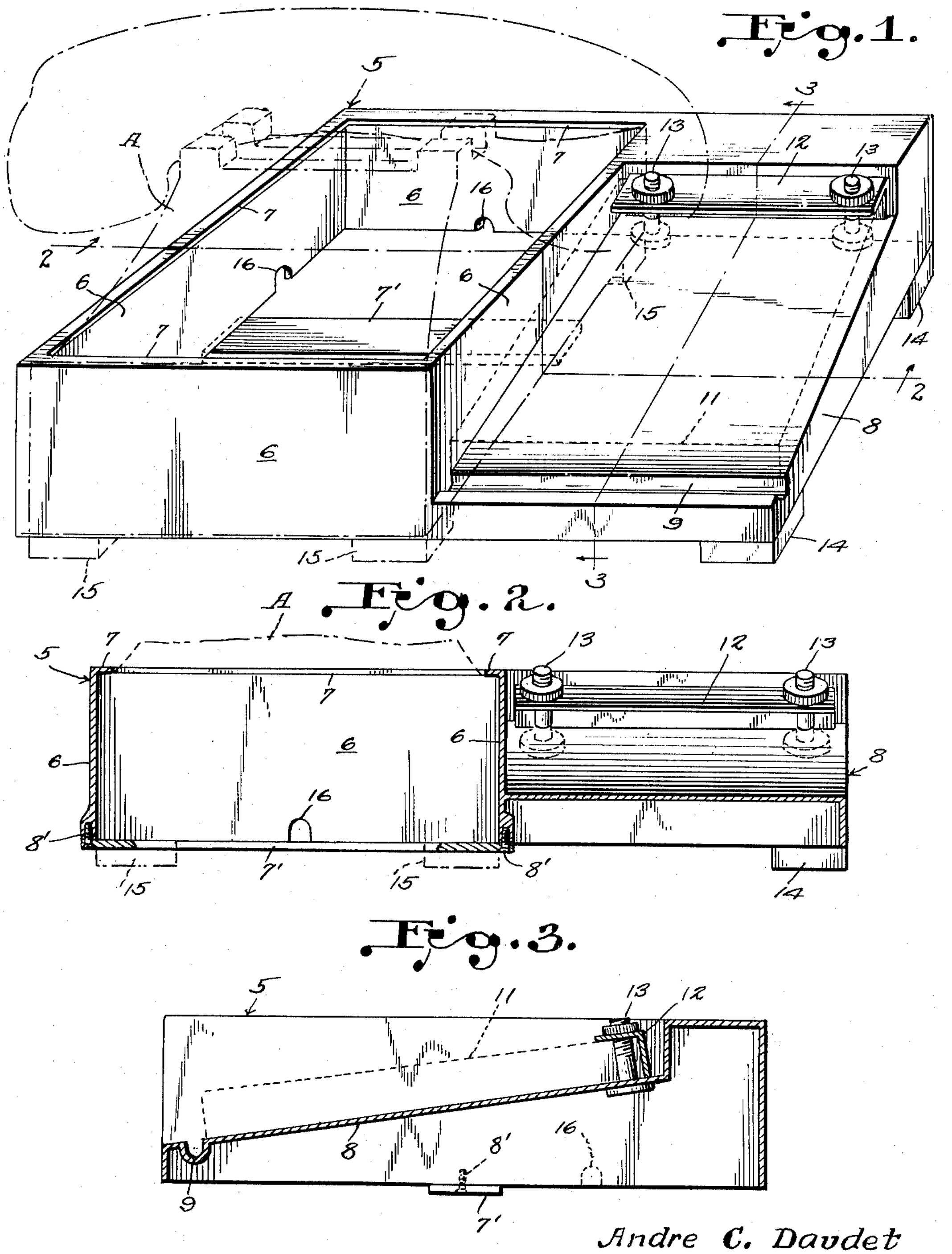
Figure 1 is a perspective view showing a combined telephone tray or holder and memo pad support constructed as an integral part thereof.
Fig. 2 is a sectional view taken on line 2—2 of Fig. 1.
Fig. 3 is a sectional view taken on line 3—3 of Fig. 1.

Referring to the drawing in detail, the device comprises a box-like tray or holder, indicated generally by the reference character 5, the tray or holder having upstanding side and end walls 6 of heights to enclose the base of the telephone positioned therein.

An inwardly extended marginal flange 7 is formed on the upper edge of the tray or holder 5, which flange is designed to engage the upper surface of the base of the telephone over which the holder is positioned to prevent the telephone from being pulled from the holder.

The bottom of the tray or holder is open, except for the supporting bar 7' which extends across the bottom of the tray at a point substantially intermediate the ends thereof, which bar is secured in place by means of the screws 8' after the holder has been positioned over the telephone.

Formed integral with the tray or holder 5 and extending laterally from one side thereof is an inclined memo pad support 8 which is formed with a transversely disposed groove 9 providing a holder for a pencil for use with the pad 11 shown in dotted lines as supported on the memo pad support 8.

A memo pad clamp 12 is secured to the inclined memo pad support 8 at the upper end thereof, by means of bolts 13 that pass therethrough and are extended through openings in the bottom of the memo pad support 8.

Feet 14 are secured to the lower edges of the memo pad support, the feet 14 being of a height equal to the height of the feet 15 of a telephone so that the tray or holder 5 will be supported evenly with the memo pad support 8. Thus it will be seen that the weight of the phone positioned in the tray or holder 8 will hold the memo pad steady while it is being used in making notes and while the phone receiver is being held in the other hand. It might be further stated that the device is constructed preferably of plastic material which will lend itself for coloring and decorations, to meet various requirements of use and color schemes.

Notches 16 are provided in the lower edges of the tray or holder to provide clearances for the wires leading from the telephone, which in the present showing is illustrated in dotted lines and indicated by the reference character A.

Having thus described the invention, what is claimed is:

A device of the class described, comprising a box-like open bottom tray having an inwardly extended marginal flange formed on the upper edge thereof, said flange adapted to contact the upper edge of a telephone positioned within the tray through the bottom of said tray, a supporting bar extending across said open bottom, and on which a telephone rests, means for securing said supporting bar in position forcing said telephone into close contact with the flange, securing the telephone within said tray, and a memo pad holder extending laterally from said tray.

References Cited in the file of this patent

UNITED STATES PATENTS

| | | |
|---|---|---|
| D. 160,224 | Smyth | Sept. 19, 1950 |
| 2,437,237 | Beitch et al. | Mar. 9, 1948 |
| 2,667,367 | Lapinski et al. | Jan. 26, 1954 |